United States Patent [19]

Lindow et al.

[11] 4,349,717
[45] Sep. 14, 1982

[54] FLUX DAM ASSEMBLY AND METHOD

[75] Inventors: Edwin L. Lindow, Plano; Bradley T. Richards, Oswego, both of Ill.

[73] Assignee: Caterpillar Tractor Co., Peoria, Ill.

[21] Appl. No.: 245,248

[22] PCT Filed: May 30, 1980

[86] PCT No.: PCT/US80/00667

§ 371 Date: May 30, 1980

§ 102(e) Date: May 30, 1980

[87] PCT Pub. No.: WO81/03454

PCT Pub. Date: Dec. 10, 1981

[51] Int. Cl.$^3$ .............................................. B23K 9/18
[52] U.S. Cl. .................................... 219/73.2; 219/73; 219/136; 228/215
[58] Field of Search .................. 219/73 R, 73.1, 73.2, 219/136, 126; 228/215

[56] References Cited

U.S. PATENT DOCUMENTS 2,802,931  8/1957  Hess .................................. 219/73 R
2,808,500  10/1957 Daudjiris .
2,900,487  8/1959  Danhier .
2,972,042  2/1961  Ashbaker .

FOREIGN PATENT DOCUMENTS 875273  8/1961  United Kingdom ............. 219/73 R

Primary Examiner—Elliot A. Goldberg
Attorney, Agent, or Firm—Phillips, Moore, Weissenberger, Lempio & Majestic

[57] ABSTRACT

The flux dams used to form mounds of granular flux in submerged arc welding deteriorate rapidly because they are subjected to elevated temperatures and high heat. These flux dams also twist and distort creating gaps. Granular flux bleeds through these gaps. Flux is wasted and the welding arc may be exposed to the atmosphere. Flux dams are also awkward to move and slow production down. The apparatus and method disclosed herein overcome these problems by utilized an elongate flux dam (19) that is stationary during welding and which extends for the length of the weld. The flux dam (19) is mounted on a heat exchanger (24) by a mounting plate (21) that minimizes thermal distortion of the flux dam (19). The heat exchanger (24), the mounting plate (21), and the flux dam (19) are pivotally connected to a support arm (26) that is mounted for motion about the platform (6) on a pivot point (32).

10 Claims, 4 Drawing Figures

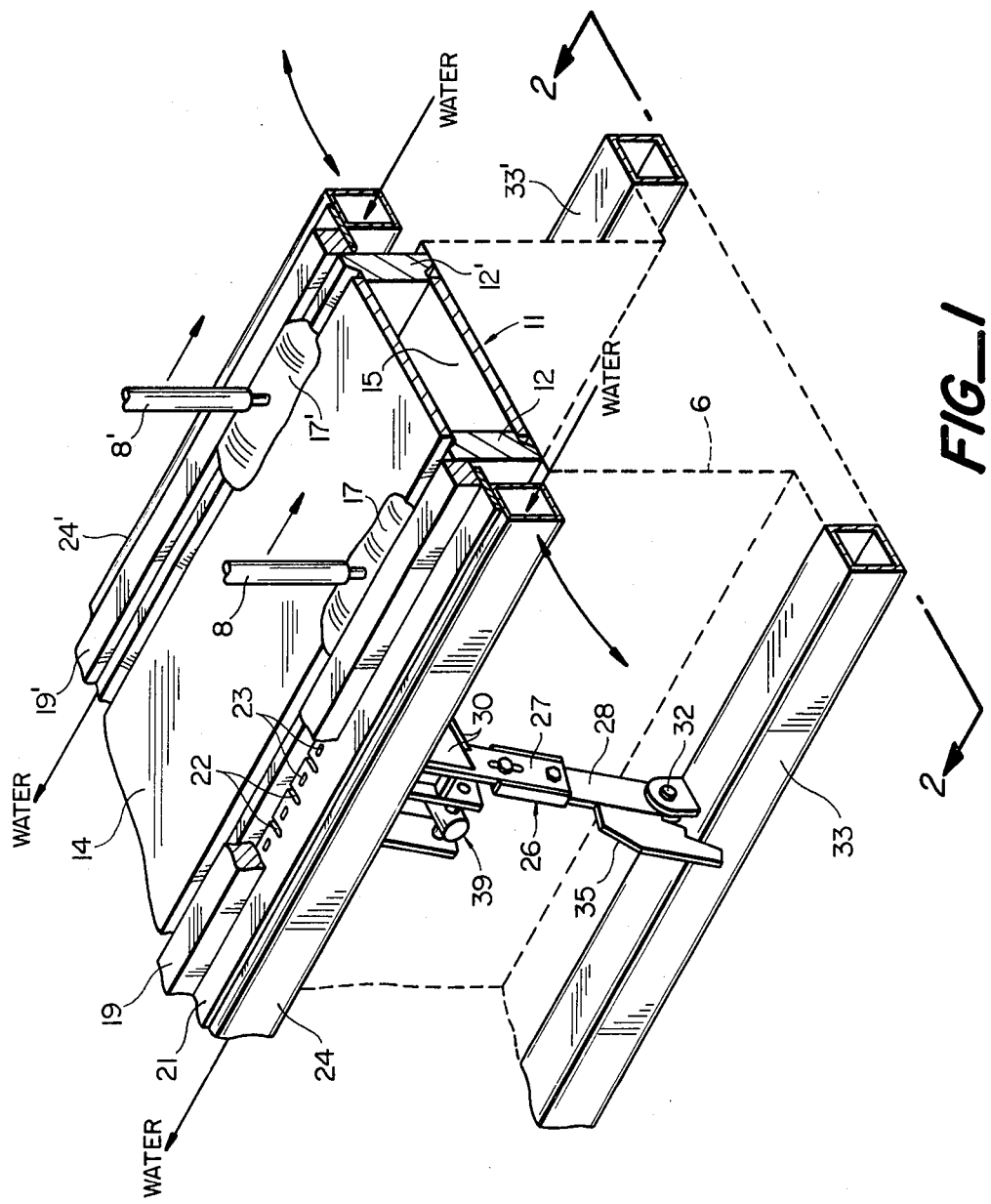

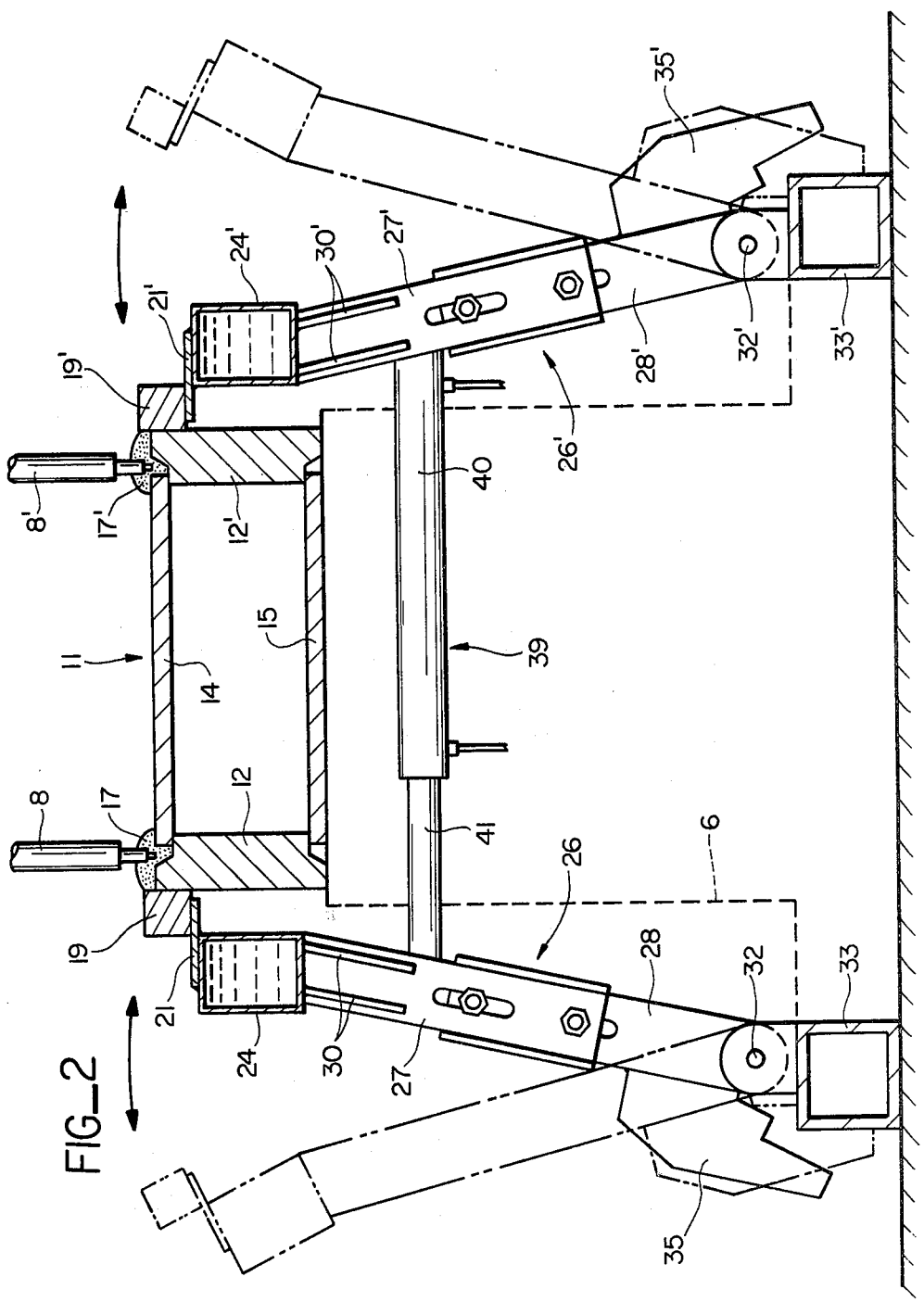
FIG_2

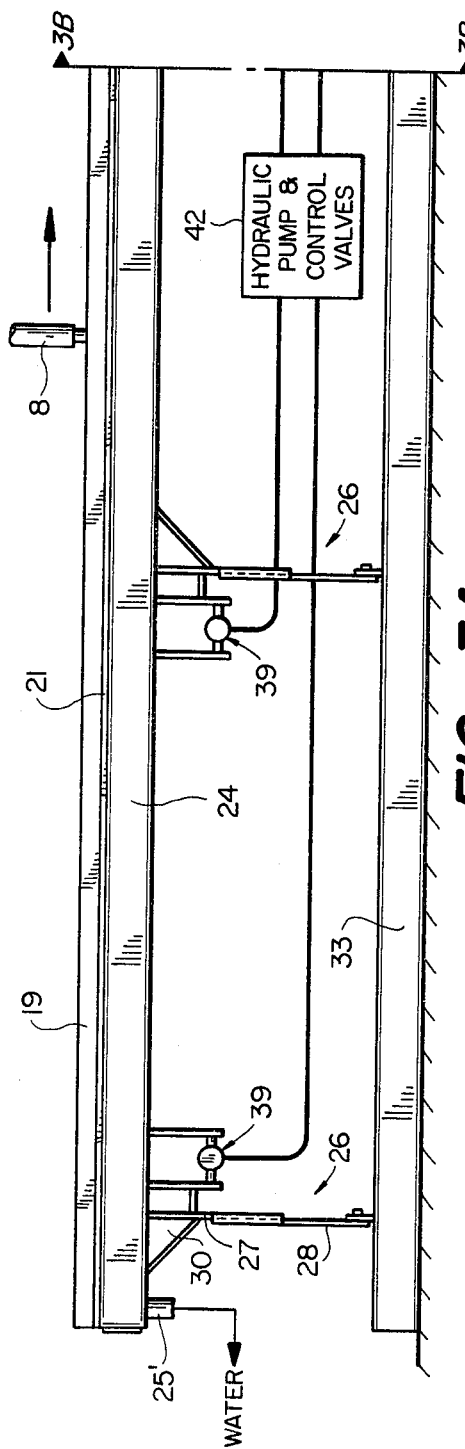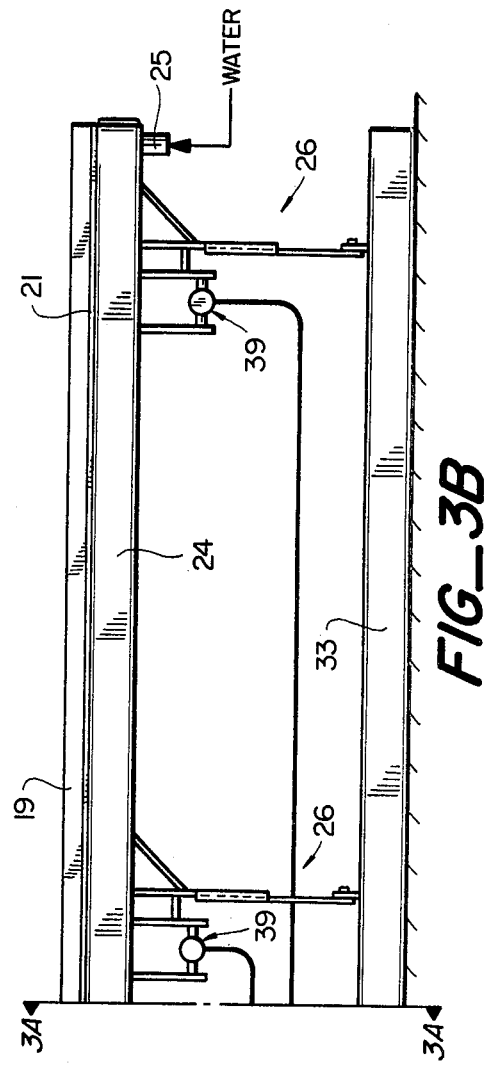

FLUX DAM ASSEMBLY AND METHOD

DESCRIPTION

TECHNICAL FIELD

This invention relates generally to submerged arc welding and more particularly to dam assemblies for retaining granular flux in position during welding.

BACKGROUND ART

Submerged arc welding with granular flux is a common commercial welding technique. In this technique granular flux is spread in a mound in front of a welding head as the welding head moves across the area of the workpiece being welded. The purpose of the flux is to prevent the welding arc from being exposed to the atmosphere. The electrode in the welding head runs through the flux and the welding arc is fully submerged in the mound of flux. To hold the flux in place while the electrode is passing through the mound, a flux dam is used. A flux dam also aids in forming the mound, reduces the amount of flux required to submerge the welding head and prevents flux from being wasted.

Since a flux dam is positioned adjacent to the welding head, the dam is subjected to high heat from the arc. Typically flux dams overheat, rapidly deteriorate, and burn up in a short period of time. In addition, when the dam begins to deteriorate, its surface becomes irregular and its shape distorts. Flux then can bleed out underneath the dam causing flux to be wasted and possibly leading to exposure of the arc to the atmosphere.

There have been several solutions suggested to the problem of deterioration of flux dams. One technique is the use of a stationary dam that is physically attached to the workpiece. This type of dam rapidly deteriorates and is usually not reused. A second solution has been the use of a traveling dam. A traveling dam moves with the welding head and is water cooled.

Prior patents in this area of technology include U.S. Pat. No. 2,808,500 to Pandjiris issued October 1, 1957; U.S. Pat. No. 2,900,487 to Danhier issued Aug. 18, 1959; and U.S. Pat. No. 2,972,042 to Ashbaker issued Feb. 14, 1961.

Prior solutions to the problem of dam deterioration have never proven to be totally satisfactory. In production situations these dams still deteriorate too rapidly. This requires that the welding process be stopped, the apparatus be disassembled, and the dams replaced.

A further problem is the long setup time required. In production situations the flux dam and the welding head must constantly be positioned on new workpieces and then moved out of the way when the weld is completed. It is desirable to speed up the positioning of the flux dams as much as possible but heretofore flux dams have slowed production because they are awkward to move and must be constantly adjusted.

The present invention is directed to overcoming one or more of the problems as set forth above.

DISCLOSURE OF THE INVENTION

In one aspect the present invention is incorporated into a submerged arc welding apparatus having a platform for a supporting workpiece, a traveling welding head mounted for movement with respect to the platform and a flux dam positionable adjacent to the workpiece for granular flux. The improvement disclosed herein includes an elongate flux dam which is stationary during welding and extends for the length of the weld. The flux dam is supported by a support arm that is pivotally connected to an axle mounted on one side of the platform.

The invention also contemplates a method for welding a workpiece wherein the flux dam is pivoted back and forth with respect to the workpiece along an arcuate path utilizing a support arm that is pivotally connected to a shaft mounted on the welding apparatus.

The present invention solves the problem of flux dam deterioration by using an elongate stationary flux dam and traveling welding heads. The traveling welding heads cause the point of heat generation to continuously move along the length of the workpiece. Thus the point of highest temperature on the adjacent dam continuously moves along the length of the dam from one end of the other. The present invention also solves the problem of flux dam deterioration by cooling the dam using an attached heat exchanger.

The problem of heat distortion is overcome by using a copper bar that longitudinally expands when heated and a support that permits this thermal elongation. With regard to minimizing setup time, the flux dams are pivotally mounted on shafts and are moved back and forth using hydraulic cylinders.

Other objects and features of the present invention are also set forth below and are illustrated in the attached drawings.

BRIEF DESCRIPTION OF THE DRAWINGS

FIG. 1 is a partial perspective view in cross section and broken away of an embodiment of the present invention.

FIG. 2 is a front elevational view, broken away and in cross section taken along line 2—2 of FIG. 1.

FIGS. 3A and B are partial side elevational views of the apparatus of FIG. 1.

BEST MODE FOR CARRYING OUT THE INVENTION

FIGS. 1–3 illustrate a submerged arc welding apparatus according to the present invention. The apparatus includes a stationary platform 6 or table, shown in phantom, which forms the bed of an automatic process welding machine. The welding machine has two traveling welding heads 8, 8' which move along a parallel path with respect to the platform. The process welder and the welding heads are of conventional construction and are designed to weld a workpiece 11 using a submerged arc process. The work piece 11, FIG. 2, includes two side plates 12, 12' a top plate 14 and a bottom plate 15. The plates are fabricated from rolled steel and the welding machine joins the plates together to form a rectangular box section. As illustrated in FIG. 2, the welding heads 8, 8' join the margins between the top plate 14 and the two side plates 12, 12'. During the welding process flux is deposited ahead of the traveling welding heads 8, 8' in a mound 17. The electrodes on the welding heads move through the flux in a manner such that the arc remains unexposed to the atmosphere.

The mounds of flux 17 are partially formed and maintained in place by a flux dam 19. The flux dam is an elongate copper bar of rectangular cross section that is stationary and positioned against the workpiece 11 during welding. As illustrated in FIG. 3, the flux dam extends for the full length of the weld and for the full length of the workpiece. A solid copper bar is used because of its high heat conductivity and durability when exposed to flux and a welding arc. In addition, copper has the quality of not mechanically distorting under conditions of elevated temperature if it is properly secured. The copper flux dam disclosed herein uniformly elongates along its longitudinal axis when heated but does not twist nor create gaps between the flux dam and the workpiece.

The flux dam 19 is secured to a mounting plate 21 which is designed to minimize thermal distortion of the flux dam and to permit longitudinal thermal elongation. The mounting plate contains a plurality of lateral slots 22, FIG. 1, located along the edge of the plate beneath the flux dam 19. The slots pass completely through the plates. The purpose of the slots 22 is to allow limited lateral thermal distortion of the mounting plate 21 to occur without distorting the heat exchangers 24. As illustrated in FIG. 1 the slots are spaced apart and between each slot are elongated mounting holes 23. These holes are elongated along an axis parallel to the longitudinal axis of the flux dam. The flux dam is secured to the mounting plate by bolts, not shown, which pass through the elongated holes. The purpose of the elongated holes is to allow the copper flux dam 19 to elongate longitudinally with respect to the mounting plate without bending or twisting.

The mounting plate 21 is rigidly attached by welding to a heat exchanger 24. The heat exchanger consists of a tubular cooling water conduit that extends for the full length of the flux dam 19. The heat exchanger supports and cools the flux dam and is utilized to extend the service life of the copper bar. At each end of the heat exchanger is either an inlet or an outlet 25, FIG. 3, for the cooling water.

Each flux dam 19 and heat exchanger 24 is supported for movement by an adjustable, telescoping support arm 26. Each support arm consists of an upper member 27 welded to the bottom of the heat exchanger 24 and reinforced by a pair of gussets 30 and a lower member 28. The upper member 27 engages a channel-shaped end of the lower member 28 and the two members are bolted together to form a rigidly securable arm. The upper and lower members each contain an elongate slot to permit both adjustment and telescoping action between the two members. The support arms telescope in order to provide adjustment to the height of the flux dam 19. This permits the dam to be moved and leveled relative to the workpiece 11 and is also used to level the flux dam if necessary.

The support arms 26 are each pivotally connected at the side of the platform 6 to a supporting pivot pin 32. This pin is mounted to a frame rail 33 which is part of the frame of the welding apparatus and the platform 6. As illustrated in FIG. 2, each flux dam 19 travels an arcuate path about the pin 32 between a first position adjacent to the workpiece 11 and a second position remote from the workpiece. In the first position the flux dam aides in forming the mound 17 and facilitates heat transfer from the welding arc. In the second position the flux dam is swung out away from the platform 6 and the workpiece 11 so that the workpiece can be loaded and unloaded quickly. The outward swing of the flux dam 19 is arrested by a stop 35 which is contoured to engage the frame rail 33. The stop is rigidly attached to the lower member 28.

The flux dams 19, 19' FIG. 2 are moved between the welding and loading positions as illustrated in FIGS. 1-3 by a plurality of hydraulic actuators 39. These actuators are pivotally connected by pins and brackets to the bottoms of the heat exchangers, 24, 24'. Hydraulic actuators can also be attached between the flux dams and the platform 6 so that the flux dams can be moved individually relative to the platform. Each hydraulic actuator includes a cylinder 40 and an operating arm 41 that extends and retracts in the conventional manner. The actuators are powered by a hydraulic pump 42, FIG. 3, and a plurality of control valves. The hydraulic actuators 39 maintain the flux dams in intimate contact with the workpiece 11 during welding. The hydraulic actuators lock the dams against the workpiece and tend to stabilize the plates 12-15 prior to welding. In a production situation the dams move back and forth either automatically or by remote control.

INDUSTRIAL APPLICABILITY

The apparatus disclosed herein is used by the Caterpillar Tractor Co. of Peoria, Ill. to fabricate track roller box sections for its Model 245 excavator. The apparatus incorporates a 12M 3509 Fauser Automatic Welder. The platform 6, FIG. 3, is approximately fourteen feet long and the flux dam 19 is a copper bar having a one and one-half inch square cross section.

To place the apparatus in operation, the flux dams 19, 19' are first moved to the outward position by extending the operating arms 41 of the hydraulic actuators 39. Next, the flow of water through the heat exchangers 24, 24' is started and the plates 12-15 are assembled together on the platform 6 to form the box section.

When the plates 12-15 are assembled as illustrated in FIG. 2, the flux dams 19, 19' are moved into position for welding by retracting the operating arms 41 into the cylinders 40. Thereafter, the welding heads 8, 8' are positioned by the welding machine and the welding process is commenced. Granular flux is distributed in front of the welding heads in a mound 17 as illustrated in FIG. 2. The welding heads move from one end of the platform to the other and depending on the application make one or more passes. When the final welding pass is complete, the flux dams 19 are moved apart by actuation of the hydraulic cylinders 39 and the workpiece is either removed or inverted on the platform 6.

It should be appreciated that the welding heads 8, 8' move relative to the stationary flux dam 19, workpiece 11 and platform 6. The point of maximum temperature elevation thus moves relative to the dam and no one point on the flux dam is continuously subjected to elevated temperatures. The heat exchangers 24 also continuously carry away the heat.

It should also be understood that although the embodiment described herein is disclosed for making linear welds along straight lines, the present invention also contemplates welding along paths of controlled curvature. In this context a flux dam is used that conforms to the path of the welding head and the support arms 26 are relocated to permit the loading and offloading of workpieces.

From the foregoing it can be seen that by using an elongate stationary flux dam and traveling welding heads and by cooling the flux dam with a heat exchanger, the problem of deterioration of the flux dam is overcome. Further, the present invention overcomes the problem of heat distortion by using a water cooled copper bar and an expansion mounting. In addition, set up time is minimized by pivotally mounting the flux dams on pivot pins and moving them back and forth using hydraulic cylinders.

Other aspects, objects and advantages of this invention can be obtained from a study of the drawings, the disclosure and the appended claims.

I claim:

1. In a submerged arc welding apparatus having a platform (6) for supporting a workpiece (11), a traveling welding head (8) mounted for movement with respect to the platform (6), and a flux dam (19) positionable adjacent to the workpiece (11) for retaining granular flux (17), the improvement comprising:
   (a) an elongate and generally vertical flux dam (19) stationary during welding and extending for the length of a weld;
   (b) a supporting pivot pin (32) mounted on one vertically disposed side of the platform (6) and below the flux dam (19); and
   (c) a generally vertically disposed support arm (26) pivotally mounted on the apparatus by the pin (32) and attached to the flux dam (19) to place the flux dam (19) against a side of the workpiece (11) and vertically thereabove.

2. An apparatus as in claim 1 wherein the support arm (26) includes two adjustable telescoping, rigidly securable members (27, 28).

3. An apparatus as in claim 1 wherein the flux dam (19) includes:
   (a) an elongate solid copper rod (19);
   (b) a fluid cooled heat exchanger (24) in thermal communication with the copper rod (19); and
   (c) means (21) for attaching the rod (19) to the heat exchanger (24) and for permitting relative motion therebetween due to thermal elongation.

4. An apparatus as in claim 3 wherein the attaching means (21) includes an elongate member (21) having a plurality of lateral slots (22) located along one margin thereof and a plurality of elongated bolt holes (23) located between said slots (22) and elongated perpendicular to the slots (22), said elongate member (21) being rigidly attached to the heat exchanger (24) and attached by bolts to the copper rod (19) via the elongated bolt holes (23).

5. A submerged arc welding apparatus, comprising:
   (a) a platform (6) for supporting a workpiece (11);
   (b) a pair of traveling welding heads (8,8') mounted for movement with respect to the platform (6);
   (c) a pair of flux dams (19,19') for retaining granular flux (17), each positionable adjacent to the workpiece (11) and stationary during welding;
   (d) a pair of moveable support arms (26,26') pivotally mounted on either side of the apparatus and each attached to one of the flux dams (19,19'); and
   (e) common means (39) connected between the support arms (26,26') for moving the flux dams (19,19') relative to the platform (6) along arcuate paths between first positions adjacent to the workpiece (11) and second positions remote from the workpiece (11).

6. An apparatus as in claim 5 wherein the common means (39) includes a hydraulic actuator (39) connected to the support arms (26,26') to maintain the flux dams (19,19') in intimate contact with the workpiece (11) during welding.

7. A submerged arc welding apparatus, comprising:
   (a) a stationary platform (6) for supporting a workpiece (11);
   (b) a traveling welding head (8) mounted for movement with respect to the platform (6);
   (c) an elongate and generally vertically disposed flux dam (19) for retaining granular flux (17), during welding said dam (19) being stationary and adjacent the workpiece (11);
   (d) a fluid cooled heat exchanger (24) in thermal communication with the flux dam (19);
   (e) a moveable support arm (26) pivotally mounted on the apparatus and attached to the flux dam (19);
   (f) hydraulic actuator means (39) connected to the support arm (26) for moving the flux dam (19) outwardly relative to the platform (6) along an arcuate path between a first position adjacent to a side of the workpiece (11) to extend vertically thereabove and a second position remote from the workpiece (11), and
   means (27,28) for adjusting the length of the support arm (26) to selectively vary the extent to which the flux dam (19) extends above the workpiece (11).

8. A method for welding a workpiece (11) using a submerged arc welding apparatus, comprising the steps of:
   (a) positioning a workpiece (11) horizontally on an elongate platform (6);
   (b) pivoting an elongate flux dam (19) along an arcuate path to a position adjacent to a side of the workpiece (11) to form a vertically disposed dam thereat extending above the workpiece (11);
   (c) depositing a mound of granular flux (17) along the workpiece (11) on the area to be welded;
   (d) moving a welding head (8) along the workpiece (11) while submerged in the mounded flux (17) and while welding the workpiece (11);
   (e) transferring the heat from welding away from the workpiece (11) through the flux dam (19) and to a heat sink (24);
   (f) pivoting the flux dam (19) along an arcuate path about the platform (6) to a position remote from the workpiece (11); and
   (g) removing the welded workpiece (11) from the elongate platform (6).

9. In a submerged arc welding apparatus having a platform (6) for supporting a workpiece (11), a traveling welding head (8) mounted for movement with respect to the platform (6), and a flux dam (19) positionable adjacent to the workpiece (11) for retaining granular flux (17), the improvement comprising:
   (a) an elongate flux dam (19) stationary during welding and extending for the length of a weld;
   (b) a supporting pivot pin (32) mounted on one side of the platform (6); and
   (c) a support arm (26) pivotally mounted on the apparatus by the pin (32) and attached to the flux dam (19), the support arm (26) including two adjustable telescoping, rigidly securable members (27,28).

10. In a submerged arc welding apparatus having a platform (6) for supporting a workpiece (11), a traveling welding head (8) mounted for movement with respect to the platform (6), and a flux dam (19) positionable adjacent to the workpiece (11) for retaining granular flux (17), the improvement comprising:
   (a) an elongate flux dam (19) stationary during welding and extending for the length of a weld, the flux dam (19) including an elongate solid copper rod (19), a fluid cooled heat exchanger (24) in thermal communication with the copper rod (19), and means (21) for attaching the rod (19) to the heat exchanger (24) and for permitting relative motion therebetween due to thermal elongation;
   (b) a supporting pivot pin (32) mounted on one side of the platform (6); and
   (c) a support arm (26) pivotally mounted on the apparatus by the pin (32) and attached to the flux dam (19).

* * * * *